US011030195B2

(12) United States Patent
Singh et al.

(10) Patent No.: US 11,030,195 B2
(45) Date of Patent: Jun. 8, 2021

(54) IDENTIFYING AND MITIGATING HIGH-RISK DATABASE QUERIES THROUGH RANKED VARIANCE ANALYSIS

(71) Applicant: FMR LLC, Boston, MA (US)

(72) Inventors: Ratnesh Kumar Singh, Bangalore (IN); Ambica Rajagopal, Pune (IN); Akhilesh Raghavendrachar Srinivasachar Kaddi, Bangalore (IN); Harikrishnan Choondani Velayudhan, Kerala (IN); Stephanie Trethaway, Westford, MA (US)

(73) Assignee: FMR LLC, Boston, MA (US)

( * ) Notice: Subject to any disclaimer, the term of this patent is extended or adjusted under 35 U.S.C. 154(b) by 494 days.

(21) Appl. No.: 15/874,539

(22) Filed: Jan. 18, 2018

(65) Prior Publication Data
US 2019/0220534 A1 Jul. 18, 2019

(51) Int. Cl.
*G06F 16/2453* (2019.01)
*G06F 16/23* (2019.01)
*G06F 16/2455* (2019.01)

(52) U.S. Cl.
CPC .... *G06F 16/24542* (2019.01); *G06F 16/2365* (2019.01); *G06F 16/2453* (2019.01); *G06F 16/2455* (2019.01)

(58) Field of Classification Search
CPC .......... G06F 16/24542; G06F 16/2365; G06F 16/2453; G06F 16/2455
See application file for complete search history.

(56) References Cited

U.S. PATENT DOCUMENTS

| 7,523,094 B1* | 4/2009 | Thiemann ......... G06F 16/24542 707/713 |
| 8,341,178 B2 | 12/2012 | Belknap et al. |
| 8,688,689 B2 | 4/2014 | Yu et al. |
| 10,133,775 B1* | 11/2018 | Ramalingam ....... G06F 16/2453 |
| 2005/0125393 A1* | 6/2005 | Yagoub ................. G06F 16/217 |
| 2008/0010240 A1 | 1/2008 | Zait |
| 2019/0095470 A1* | 3/2019 | Dundjerski ......... G06F 11/0757 |

* cited by examiner

*Primary Examiner* — Ken Hoang
(74) *Attorney, Agent, or Firm* — Proskauer Rose LLP

(57) ABSTRACT

Methods and apparatuses are described for system for identifying and mitigating high-risk database queries through ranked variance analysis. A server identifies database queries executed against databases in a production computing environment within a predetermined time period, each database query associated with execution plans and each execution plan having corresponding plan data elements. For each database query: the server generates execution variance data for the execution plans for a database query based upon the corresponding plan data elements, comprising: determining an execution time variance between the execution plans; and determining a buffer gets variance between the execution plans. The server ranks the database queries according to (i) the execution time variance, and (ii) the buffer gets variance. The server computing device identifies high-risk database queries based upon the rank, and adjusts execution settings for each of the identified high-risk database queries to mitigate performance degradation in the production computing environment.

21 Claims, 5 Drawing Sheets

| SqlID | ParsingSchemaName | NumOfPlans | NumOfExecutions | QueryRiskRank |
|---|---|---|---|---|
| | | | | 1 |
| 26ivgzn5xjo5 | FL_TRADING | 12 | 2848 | 2 |
| 41x4ovtgm3371 | FL_REFERENCE | 2 | 137351 | 3 |
| gf2c3ryvdhv9 | FL_TRADING_DM | 8 | 5156 | 4 |
| 1zns27xd1s8h | FL_DB_APPL | 15 | 575311 | 5 |
| thxmpg6g26b1a | FL_TRADING_DM | 16 | 73140 | 6 |
| cbpm33hv21qb7 | FL_DB_APPL | 40 | 20671 | 7 |
| 9pv4stycwzzfw | FL_DB_APPL | 2 | 1546605 | 8 |
| 67zc48cdc7zt1 | FL_DB_APPL | 2 | 300060 | 9 |
| 9j318sgbug3rt | FL_DB_APPL | 8 | 56536 | 10 |
| 1h7939s591nrk | FL_DB_APPL | 52 | 1426909 | 11 |
| 9pwxg4qgm86r | FL_DB_APPL | 139 | 588863 | 12 |
| bu1q4rz465f8 | FL_DB_APPL | 11 | 1081475 | 13 |
| 0xag3ps9s6bj | FL_DB_APPL | 6 | 13761 | 14 |

FIG. 3

| SqlID | ParsingSchema | PlanHashValue | AvgETSecs | AvgBufferGets | TotalExecutions | AvgDiskRead | AvgCPUTime | LastExecTime |
|---|---|---|---|---|---|---|---|---|
| 3s0x92c6u6qzz | FI_TRADING_DM | 124490976 | 11.924812 | 710343 | 1 | 725 | 5.4372 | 11/09/2016 01:30 |
| 3s0x92c6u6qzz | FI_TRADING_DM | 461347402 | 0.940396 | 108026 | 1 | 0 | 0.9239 | 11/15/2016 00:30 |
| 3s0x92c6u6qzz | FI_TRADING_DM | 538049576 | 21.466136 | 454007 | 2 | 2550 | 5.0232 | 11/15/2016 02:00 |
| 3s0x92c6u6qzz | FI_TRADING_DM | 1185705744 | 0.571521 | 40936 | 1 | 71 | 0.5129 | 11/16/2016 02:00 |
| 3s0x92c6u6qzz | FI_TRADING_DM | 900021632 | 0.772234 | 63299 | 1 | 33 | 0.5959 | 11/18/2016 00:30 |
| 3s0x92c6u6qzz | FI_TRADING_DM | 695153727 | 25.304480 | 444759 | 3 | 6636 | 5.6451 | 11/22/2016 00:30 |
| 3s0x92c6u6qzz | FI_TRADING_DM | 74794484 | 0.905878 | 89648 | 1 | 0 | 0.8979 | 11/22/2016 01:00 |
| 3s0x92c6u6qzz | FI_TRADING_DM | 174881814 | 6.719397 | 542441 | 6 | 233 | 5.2615 | 11/22/2016 01:00 |
| 3s0x92c6u6qzz | FI_TRADING_DM | 2877857417 | 0.521552 | 53367 | 8 | 2 | 0.5007 | 11/22/2016 01:30 |
| 3s0x92c6u6qzz | FI_TRADING_DM | 2208026000 | 0.597564 | 30239 | 2 | 5 | 0.5554 | 11/22/2016 22:00 |
| 3s0x92c6u6qzz | FI_TRADING_DM | 3452957216 | 0.367088 | 165101 | 32 | 0 | 0.3522 | 11/24/2016 02:00 |
| 3s0x92c6u6qzz | FI_TRADING_DM | 622172238 | 0.383084 | 55330 | 20 | 31 | 0.3390 | 11/25/2016 01:30 |
| 3s0x92c6u6qzz | FI_TRADING_DM | 4158853013 | 3.303899 | 288780 | 53 | 9 | 3.2366 | 11/25/2016 01:30 |
| 3s0x92c6u6qzz | FI_TRADING_DM | 3631614480 | 2.878868 | 225064 | 1 | 7 | 2.8376 | 11/29/2016 02:00 |

FIG. 4

IDENTIFYING AND MITIGATING HIGH-RISK DATABASE QUERIES THROUGH RANKED VARIANCE ANALYSIS

TECHNICAL FIELD

This application relates generally to methods and apparatuses, including computer program products, for identifying and mitigating high-risk database queries through ranked variance analysis.

BACKGROUND

Typically, large organizations have extremely complex back-end database environments that need to support millions or billions of queries per day against various databases, each of which may contain dozens or hundreds of terabytes of data. Such database environments generally use thousands of queries in the production environment to support front-end software applications. Performance degradation of a single query can have a critical negative impact on important functions of the computing environment, causing significant technical problems—such as slow response times, delay of execution, increased processing overhead, bottlenecking, and application downtime.

In some database environments, operators use query optimizers such as Oracle Optimizer to determine query execution plans (QEPs) that provide different ways to execute a query against the database environment. However, each query may have multiple QEPs associated with it and, with thousands of queries available for execution, identification and mitigation of high-risk queries and QEPs (e.g., queries and QEPs that are at high risk of causing technical problems) is very difficult.

SUMMARY

Therefore, what is needed are methods and systems for identifying and mitigating high-risk database queries and QEPs through ranked variance analysis. The techniques described herein provide the specific technical advantage over existing systems of employing an automated predictive model (using historical and/or real-time query data) to identify queries in a database that are predicted to have large variances in, e.g., average number of database rows processed, average execution time, average buffer gets, and the like. The system ranks the identified queries from highest to lowest risk based upon the variance data so the system can quickly identify and mitigate the most problematic queries in order to have the most significant improvement in the operation of the production computing environment.

The invention, in one aspect, features a system for identifying and mitigating high-risk database queries through ranked variance analysis. The system includes a server computing device that identifies a plurality of database queries executed against one or more databases in a production computing environment within a predetermined time period, each database query associated with a plurality of execution plans, each execution plan having corresponding plan data elements. For each database query: the server computing device generates execution variance data for the plurality of execution plans for a database query based upon the corresponding plan data elements, comprising: determining an execution time variance between the plurality of execution plans for the database query; and determining a buffer gets variance between the plurality of execution plans for the database query. The server computing device ranks the plurality of database queries according to (i) the execution time variance for each database query, and (ii) the buffer gets variance for each database query. The server computing device identifies one or more high-risk database queries based upon the rank of the plurality of database queries, and adjusts one or more execution settings for each of the identified high-risk database queries to mitigate performance degradation in the production computing environment caused by execution of the identified high-risk database queries.

The invention, in another aspect, features a computerized method of identifying and mitigating high-risk database queries through ranked variance analysis. A server computing device identifies a plurality of database queries executed against one or more databases in a production computing environment within a predetermined time period, each database query associated with a plurality of execution plans, each execution plan having corresponding plan data elements. For each database query: the server computing device generates execution variance data for the plurality of execution plans for a database query based upon the corresponding plan data elements, comprising: determining an execution time variance between the plurality of execution plans for the database query; and determining a buffer gets variance between the plurality of execution plans for the database query. The server computing device ranks the plurality of database queries according to (i) the execution time variance for each database query, and (ii) the buffer gets variance for each database query. The server computing device identifies one or more high-risk database queries based upon the rank of the plurality of database queries, and adjusts one or more execution settings for each of the identified high-risk database queries to mitigate performance degradation in the production computing environment caused by execution of the identified high-risk database queries.

The invention, in another aspect, features a computer program product, tangibly embodied in a non-transitory computer readable storage device, for identifying and mitigating high-risk database queries through ranked variance analysis. The computer program product includes instructions operable to cause a server computing device to identify a plurality of database queries executed against one or more databases in a production computing environment within a predetermined time period, each database query associated with a plurality of execution plans, each execution plan having corresponding plan data elements. For each database query: the server computing device generates execution variance data for the plurality of execution plans for a database query based upon the corresponding plan data elements, comprising: determining an execution time variance between the plurality of execution plans for the database query; and determining a buffer gets variance between the plurality of execution plans for the database query. The server computing device ranks the plurality of database queries according to (i) the execution time variance for each database query, and (ii) the buffer gets variance for each database query. The server computing device identifies one or more high-risk database queries based upon the rank of the plurality of database queries, and adjusts one or more execution settings for each of the identified high-risk database queries to mitigate performance degradation in the production computing environment caused by execution of the identified high-risk database queries.

Any of the above aspects can include one or more of the following features. In some embodiments, the plan analytics data elements comprise a query id number, a parsing schema, a number of plan executions, an average execution time, an average number of buffer gets, and a query text. In some embodiments, determining an execution time variance comprises: identifying the average execution time for each of the plurality of execution plans for the database query; selecting a maximum average execution time (MaxAET) and a minimum average execution time (MinAET) from the identified average execution times; determining a variance between MaxAET and MinAET by: (MaxAET−MinAET)/MinAET; and assigning the determined variance as the execution time variance. In some embodiments, determining the buffer gets variance comprises: identifying the average number of buffer gets for each of the plurality of execution plans for the database query; selecting a maximum average number of buffer gets (MaxABG) and a minimum average execution time (MinABG) from the identified average numbers of buffer gets; generating the variance between MaxABG and MinABG by: ((MaxABG−MinABG)/MinABG; and assigning the determined variance as the buffer gets variance.

In some embodiments, ranking the plurality of database queries comprises sorting the plurality of database queries in a list from a highest value for the execution time variance for each database query to a lowest value for the execution time variance for each database query. In some embodiments, ranking the plurality of database queries comprises sorting the plurality of database queries in a list from a highest value for the buffer gets variance for each database query to a lowest value for the buffer gets variance for each database query. In some embodiments, identifying one or more high-risk database queries comprises selecting database queries from the plurality of database queries that are associated with an execution time variance exceeding a predetermined threshold. In some embodiments, identifying one or more high-risk database queries comprises selecting database queries from the plurality of database queries that are associated with a buffer gets variance exceeding a predetermined threshold.

In some embodiments, adjusting one or more execution settings for each of the identified high-risk database queries to mitigate performance degradation in the production computing environment caused by execution of the identified high-risk database queries comprises: changing an execution status for the identified high-risk database query in the database which, when analyzed by the production computing environment, prevents the identified high-risk database query from being executed in the production computing environment. In some embodiments, adjusting one or more execution settings for each of the identified high-risk database queries to mitigate performance degradation in the production computing environment caused by execution of the identified high-risk database queries comprises: removing one or more execution plans associated with the identified high-risk database query from the database in the production computing environment. In some embodiments, adjusting one or more execution settings for each of the identified high-risk database queries to mitigate performance degradation in the production computing environment caused by execution of the identified high-risk database queries comprises: recompiling one or more of the execution plans associated with the identified high-risk database query to generate a new execution plan and storing the new execution plan in the database in the production computing environment.

In some embodiments, identifying a plurality of database queries executed against one or more databases in a production computing environment within a predetermined time period comprises: filtering one or more database queries from the plurality of database queries based upon a user ID that executed the database query. In some embodiments, identifying a plurality of database queries executed against one or more databases in a production computing environment within a predetermined time period comprises: filtering one or more database queries from the plurality of database queries based upon a number of executions of the database query during the predetermined time period.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 3 is a screenshot of an exemplary user interface provided by the server computing device for analyzing high-risk database queries.

FIG. 4 is a screenshot of an exemplary user interface provided by the server computing device for analyzing plan details for high-risk database queries.

DETAILED DESCRIPTION

Figure 1:
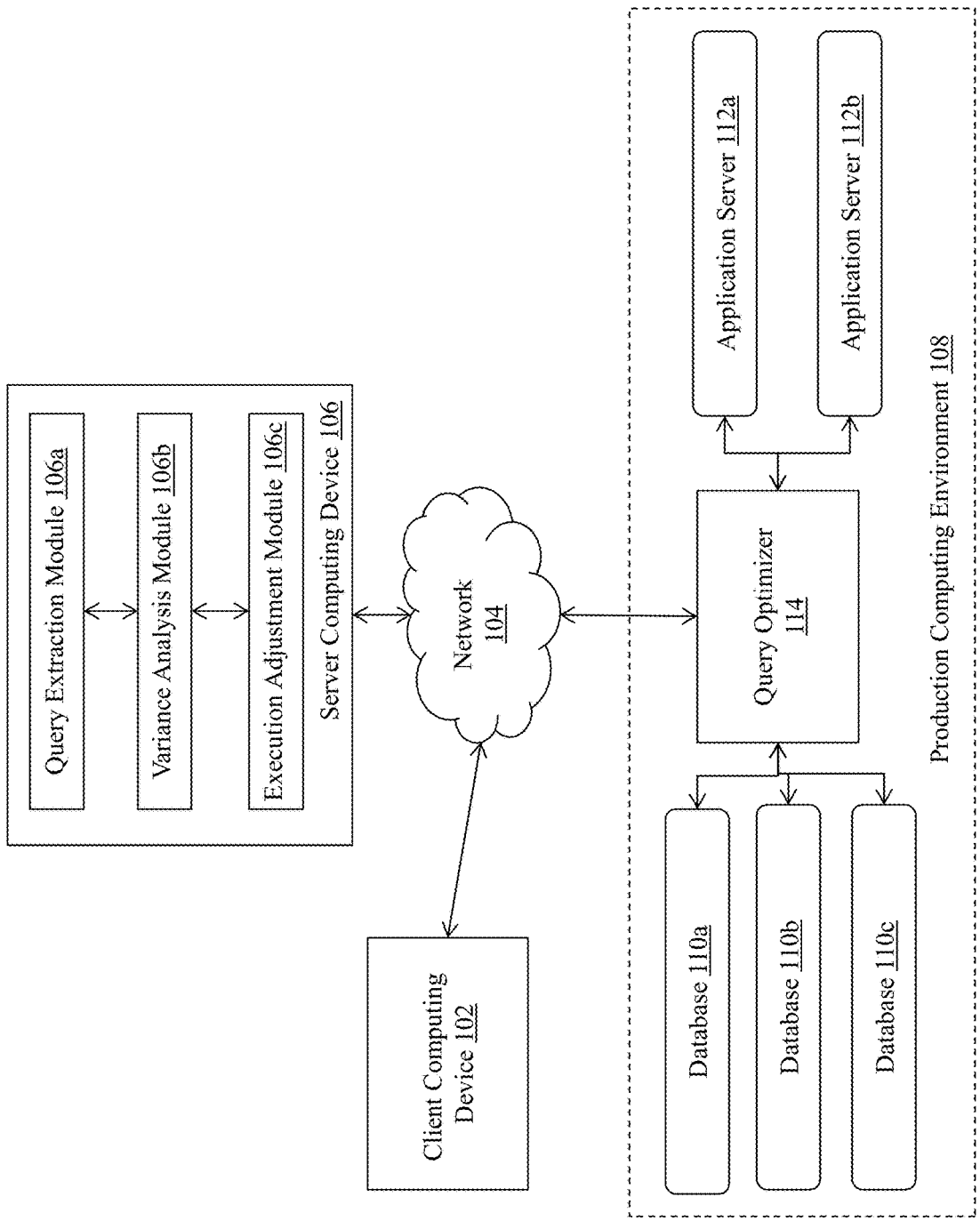
FIG. 1 is a block diagram of a system for identifying and mitigating high-risk database queries through ranked variance analysis.

FIG. 1 is a block diagram of a system 100 for identifying and mitigating high-risk database queries through ranked variance analysis. The system 100 includes a client computing device 102, a communications network 104, and a server computing device 106 with several computing modules, including a query extraction module 106a, a variance analysis module 106b, and an execution adjustment module 106c. The system 100 also includes a production computing environment 108 that has a plurality of back-end databases 110a-110c and a plurality of application servers 112a-112b that provide various software applications (e.g., browser-based applications, software as a service applications, etc.) to other remote computing devices. The production computing environment 108 also includes a query optimizer (e.g., available from Oracle) that generates execution plans for queries (e.g., SQL statements) requested from application servers 112a-112b for execution against databases 110a-110c.

The client computing device 102 connects to the communications network 104 in order to communicate with the server computing device 106 to provide input and receive output relating to the process of identifying and mitigating high-risk database queries through ranked variance analysis as described herein. In some embodiments, the client computing device 102 can be coupled to a display device for, e.g., providing a detailed graphical user interface (GUI) that receives input for and presents output resulting from the methods and systems described herein.

Exemplary client devices 102 include but are not limited to desktop computers, laptop computers, tablets, mobile devices, smartphones, and internet appliances. It should be appreciated that other types of computing devices that are capable of connecting to the components of the system 100 can be used without departing from the scope of invention. Although FIG. 1 depicts a single client device 102, it should be appreciated that the system 100 can include any number of client devices.

The communications network 104 enables the other components of the system 100 to communicate with each other in order to perform the process of identifying and mitigating high-risk database queries through ranked variance analysis as described herein. The network 104 may be a local network, such as a LAN, or a wide area network, such as the Internet and/or a cellular network. In some embodiments, the network 104 is comprised of several discrete networks and/or sub-networks (e.g., cellular to Internet) that enable the components of the system 100 to communicate with each other.

The server computing device 106 is a combination of hardware and software modules that includes specialized hardware and/or software modules that execute on a processor and interact with memory modules of the server computing device 106 to perform functions for identifying and mitigating high-risk database queries through ranked variance analysis as described herein. The server computing device 106 includes a query extraction module 106a, a variance analysis module 106b, and an execution adjustment module 106c (as mentioned above) that execute on and/or interact with the processor of the server computing device 106.

In some embodiments, the query extraction module 106a, the variance analysis module 106b, and the execution adjustment module 106c are specialized sets of computer software instructions programmed onto one or more dedicated processors in the server computing device 106 and can include specifically-designated memory locations and/or registers for executing the specialized computer software instructions. Although the modules 106a-106c are shown in FIG. 1 as executing within the same server computing device 106, in some embodiments the functionality of the modules 106a-106c can be distributed among a plurality of server computing devices. As shown in FIG. 1, the server computing device 106 enables the modules 106a-106c communicate with each other in order to exchange data for the purposes of performing the described functions. It should be appreciated that any number of computing devices, arranged in a variety of architectures, resources, and configurations (e.g., cluster computing, virtual computing, cloud computing) can be used without departing from the scope of the invention. The exemplary functionality of the modules 106a-106c is described in detail below.

The production computing environment 108 comprises a plurality of back-end databases 110a-110c, a plurality of application servers 112a-112b, and a query optimizer, the functionality of which is described below. The back-end databases 110a-110c are one or more virtual and/or physical computing devices configured to receive, generate, and store specific segments of data (e.g., for one or more applications that require a large and complex dataset). Typically, the databases 110a-110c comprise structured data stores, such as relational databases. The databases 110a-110c can be coordinated to work in conjunction with each other to respond to incoming query requests by executing database queries to store and access certain data within the database schema. An exemplary database platform utilized by the back-end databases 110a-110c is Oracle Database 12c available from Oracle, Inc. It should be appreciated that the databases 110a-110c can be configured to operate in any number of networking and hardware paradigms, including but not limited to cloud computing, federated databases, virtual databases, and the like.

The application servers 112a, 112b in the production computing environment 108 are computing devices that provide functionality for front-end software applications, implemented on any of a number of operating system platforms and configured to provide software functionality to remote computing devices via a network (e.g., browser-based applications, software-as-a-service applications, and the like). An example might be a browser-based application for a remote computing device to log into a secure website and interact with a dataset by requesting information from one or more of the back-end databases 110a-110c. When the remote computing device requests information, the application server 112a can execute one or more database queries against one or more of the back-end databases 110a-110c to retrieve the requested information.

In some embodiments, the software applications executed by the application servers 112a, 112b are operated using browser software located on remote computing devices. Exemplary browser software includes, but is not limited to, Mozilla Firefox™ available from Mozilla Corp., Google Chrome™ available from Google Inc., Safari available from Apple Inc., and Microsoft Edge™ available from Microsoft Corp. The applications can comprise browser software installed on a computing device that is launched upon receipt of a particular Uniform Resource Identifier (URI), such as a web address or URL. In some embodiments, the browser-based applications 110a-110c are directed to a URI that references functionality on the application server (e.g., a web server configured to serve a web-based application).

As mentioned above, the query optimizer 114 analyzes the database queries both executed against and stored in the back-end databases 110a-110c by the application servers 112 a, 112b and generates one or more query execution plans (QEPs) for each database query. A query execution plan is typically a set of steps used to access the data in the databases. Because there may be multiple different and correct ways to execute a database query, the query optimizer 114 analyzes these different execution options and, sometimes, selects the 'best option' (e.g., most efficient, fastest, requiring least bandwidth, etc.) based upon certain criteria. The query optimizer 114 can store the various query execution plans for a given query in the databases 110a-110c so that the query execution plans can be retrieved and processed when the query is requested for execution.

Figure 2:
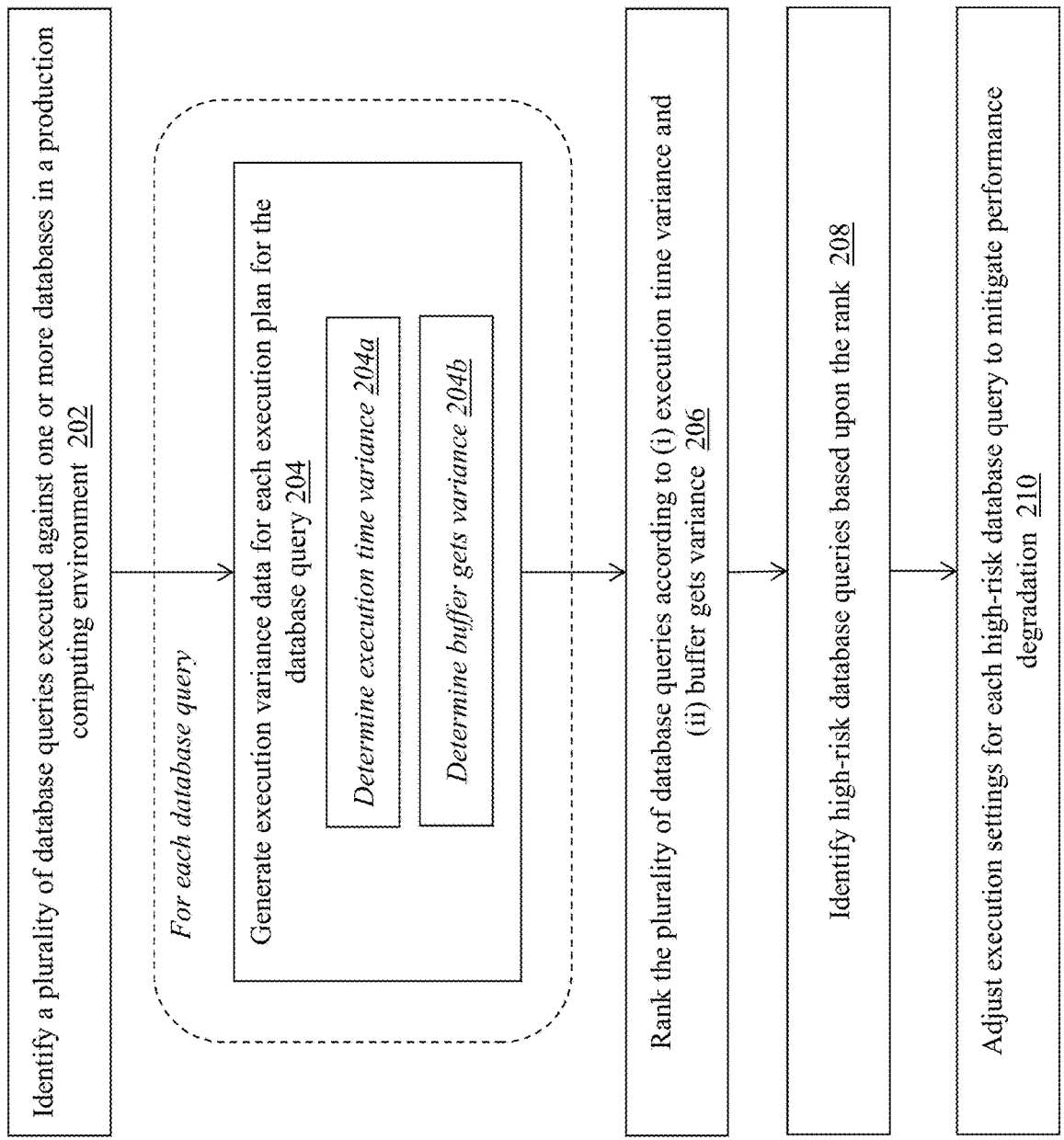
FIG. 2 is a flow diagram of a computerized method of identifying and mitigating high-risk database queries through ranked variance analysis.

FIG. 2 is a flow diagram of a computerized method 200 of identifying and mitigating high-risk database queries through ranked variance analysis, using the system 100 of FIG. 1. The query extraction module 106a of the server computing device 106 identifies (202) a plurality of database queries executed against one or more databases (e.g., databases 110a-110c) in a production computing environment 108. Each database query can be associated with a plurality of QEPs generated by the query optimizer 114 and each QEP can have corresponding plan data elements. In some embodiments, the query extraction module identifies database queries executed during a predetermined time period in the recent past (e.g., one day, one week, one month, three months, etc.). In one embodiment, the query extraction module 106 a executes a Sqoop script (Sqoop™ software available from the Apache Software Foundation) to extract the relevant query data from the databases 110a-110c; the Sqoop script can be executed according to a particular automated job control/scheduling module (e.g., Autosys). Generally, the data extracted by the query extraction module 106a comprises plan data elements relating to the executed database queries and their corresponding query execution plans (e.g., generated by query optimizer 114). In some embodiments, the plan analytics data elements comprise a query id number (e.g., SQL_ID), a parsing schema (e.g., PARSING_SCHEMA_NAME), a total number of plan executions (e.g., TOTAL_EXECUTIONS), an average execution time (e.g., AVG_EXECUTION_TIME), an average number of buffer gets (e.g., AVG_BUFFER_GETS), and query text for the corresponding database query.

In some embodiments, the query extraction module 106a can filter the data associated with the plurality of database queries in order to, e.g., remove data for queries that may not be relevant or worthwhile to include. For example, certain queries may not be executed very often (e.g., less than ten times in the last thirty days), certain queries may be executed by specific database admin accounts (e.g., SYS, DBADMIN), or certain queries may only be associated with one QEP. In these cases, further analysis of the queries for the purposes of risk mitigation and performance improvement across multiple QEPs may not be necessary. As a result, the query extraction module 106a can identify queries and associated QEPs that do not qualify for further analysis and filter out the plan data elements for those queries/QEPs from the plan elements dataset that will be analyzed by the server computing device 106.

In some embodiments, the query extraction module 106a generates one or more files to contain the plan data elements extracted from the databases 110a-110c. For example, the query extraction module 106a can create a plurality of .csv files that contain the extracted data (e.g., each file can contain one day of query execution data). The files can be stored in a database coupled to the server computing device 106, local memory of the server computing device, etc.

For each database query identified by the query extraction module 106a, the variance analysis module 106b generates (204) execution variance data for each execution plan associated with the database query, based upon the extracted plan data elements. The variance analysis module 106b determines (204a) an execution time variance between the plurality of execution plans (e.g., QEPs) associated with the database query. For example, a database query may have four different QEPs generated by the query optimizer 114, and the average execution time for each QEP can be different:

TABLE 1

| QEP | Average Execution Time |
|---|---|
| 1 | 10.72 seconds |
| 2 | 12.14 seconds |
| 3 | 14.41 seconds |
| 4 | 80.2 seconds |

In determining the execution time variance, the variance analysis module 106b can identify the average execution time for each of the plurality of QEPs and select a maximum average execution time (MaxAET) and a minimum average execution time (MinAET) from the average execution times. Using the example in Table 1 above, MaxAET is 80.2 seconds and MinAET is 10.72 seconds. The variance analysis module 106b determines a variance (AETV) between MaxAET and MinAET using the following equation:

$$AETV = \frac{(\text{Max}AET - \text{Min}AET)}{\text{Min}AET}$$

Using the example in Table 1 above, AETV for the database query is (80.2−10.72)/10.72, or 6.48. The variance analysis module 106b assigns the determined variance value (AETV) as the execution time variance for the database query.

Next, the variance analysis module 106b determines a buffer gets variance (BGV) for the same database query using the plan data elements. When the database platform (e.g., Oracle) requires a block of data (e.g., 8k), it reads the data either from a buffer or from the disk itself. So the number of buffer gets associated with a QEP represents the number of times the database platform had to access a block of data. For example, the same database query may have a different average number of buffer gets for each query execution plan:

TABLE 2

| QEP | Average Buffer Gets |
|---|---|
| 1 | 32,570 |
| 2 | 41,344 |
| 3 | 105,125 |
| 4 | 419,141 |

In determining the buffer gets variance, the variance analysis module 106b can identify the average number of buffer gets for each of the plurality of QEPs and select a maximum average number of buffer gets (MaxABG) and a minimum average number of buffer gets (MinABG) from the average number of buffer gets. Using the example in Table 2 above, MaxABG is 419,141 and MinABG is 32,570. The variance analysis module 106b determines a variance (ABGV) between MaxABG and MinABG using the following equation:

$$ABGV = \frac{(\text{Max}ABG - \text{Min}ABG)}{\text{Min}ABG}$$

Using the example in Table 2 above, ABGV for the database query is (419,141−32,570)/32,570, or 11.87. The variance analysis module 106b assigns the determined variance value (ABGV) as the buffer gets variance for the database query.

After the variance analysis module 106b has generated the execution variance data for each execution plan associated with each different database query, the variance analysis module 106b ranks (206) the plurality of database queries according to their corresponding (i) execution time variance (AETV) and (ii) buffer gets variance (ABGV). The variance analysis module 106b can rank the database queries using any of a number of different algorithms with the variance data as inputs. For example, the variance analysis module 106b can weigh the AETV and ABGV for each database query based upon certain criteria, such as database(s) which the query is executed against, application(s) that request data using the query, or other types of criteria. In one example, the variance analysis module 106b ranks the database queries according to a sum of their corresponding AETV and ABGV, where a lower sum is indicative of a lower risk (i.e., because there is less variance in execution time and buffer gets associated with execution of the query):

TABLE 3

| QUERY ID | AETV | ABGV | Sum(AETV + ABGV) | Rank |
|---|---|---|---|---|
| A123 | 2.51 | 1.79 | 4.30 | 1 |
| B521 | 3.12 | 1.44 | 4.56 | 2 |
| C334 | 5.79 | 3.11 | 8.90 | 3 |
| D898 | 8.95 | 11.12 | 20.07 | 4 |

As shown above, the database queries are ranked from lowest total variance to highest total variance. Of course, the database queries can be ranked from highest total variance to lowest total variance. Also, it should be appreciated that there are other ways to analyze the variance data to generate a ranking for the database queries. For example, the ranking can be based upon either AETV or ABGV, a combination of both, or as noted above, an algorithm that factors the values into a more complex analysis (e.g., weighting). Also, it should be appreciated that other metrics or attributes of database query execution can be used within the scope of the techniques described herein.

The variance analysis module 106b identifies (208) one or more high-risk database queries based upon the rankings. For example, the variance analysis module 106b can use threshold values to determine which queries carry a higher risk of resulting in performance degradation in the production computing environment 108. In one example, the variance analysis module 106b can select database queries that are associated with an execution time variance that meets or exceeds a predetermined threshold value. In another example, the variance analysis module 106b can select database queries that are associated with a buffer gets variance that meets or exceeds a predetermined threshold. The variance analysis module 106b can identify the high-risk database queries using the ranking and store identification information (e.g., QUERY_ID, QEP data) in order to mitigate the risk as described below.

When the variance analysis module 106b has identified one or more high-risk database queries based upon the execution variance data as described above, the execution adjustment module 106c receives the identification of the queries and their associated QEP information and adjusts (210) one or more execution settings for each of the identified queries to mitigate performance degradation in the production computing environment 108 that is caused by execution of the identified high-risk queries (e.g., using the QEPs with high variance values). The execution adjustment module 106c communicates with the back-end databases 110a-110c, the application servers 112a, 112b, and the query optimizer 114 to conduct technical changes to the production computing environment 108 that affect the execution status of certain queries, the organization, structure, and availability of certain QEPs, and the operation of certain applications running on the application servers 112a, 112b, the result of which is improved performance for data operations and lesser risk for problematic query execution in the production computing environment.

In one example, the execution adjustment module 106c changes an execution status for the identified high-risk database queries (e.g., in a table in one or more of the databases 110a-110c) so that the execution of the high-risk query is affected. For example, the change to the execution status can prevent the query from being executed—an application server requesting information that requires execution of the query can analyze the execution status information and determine that, e.g., the query is unavailable or otherwise cannot be executed against the databases 110a-110c. This could result in certain functionality of the software application provided by the application server to be offline or inactive while the query is unavailable.

In another example, the execution adjustment module 106c can communicate with the query optimizer 114 and/or the databases 110a-110c to remove one or more of the QEPs from being associated with the high-risk database query—so that the QEP is not used for future executions of the database query by the databases and the application servers, but instead one or more of the other QEPs associated with the database query are used instead. The removed QEP may be associated with high execution times and/or high buffer get values (as noted above) which may suggest the query is not performing well or is causing unnecessary or undesirable overhead in the production computing environment. In this example, the execution adjustment module 106c can instruct the query optimizer 114 to delete the QEP in question from the database, or otherwise disassociate the QEP from the query so that the QEP is not used.

In another example, the execution adjustment module 106c can communicate with the query optimizer 114 to request that one or more of the QEPs associated with a high-risk database query be recompiled to, e.g., generate a new execution plan or plans for the database query and store the new execution plan(s) in, e.g., the databases 112a-112c for future execution. For example, the execution adjustment module 106c can instruct the query optimizer 114 to regenerate either one QEP for a given query (e.g., by identifying the QEP) or to regenerate all of the QEPs for a given query so that a potential error or problem with the QEPs may be remedied via recompilation.

As mentioned above, the server computing device 106 and its modules 106a-106c can communicate via network 104 with the client computing device 102 for the purposes of providing input and receiving output relating to the process of identifying and mitigating high-risk database queries through ranked variance analysis as described herein. For example, a user at client computing device 102 can interact with, e.g., one or more user interfaces provided by the server computing device 106 in order to view historical and/or real-time query execution data, to view plan execution information (such as execution statistics, plan text, query text, etc.), and to take additional remediation steps for high-risk queries previously identified by the system.

FIG. 3 is a screenshot of an exemplary user interface provided by the server computing device 106 for analyzing high-risk database queries as described herein. As shown in FIG. 3, the user interface includes a table with columns for displaying information about the high-risk database queries, such as identifier (SQL_ID) 302, number of QEPs associated with the query (NumOfPlans) 304, number of executions of the query (e.g., during the predetermined time period) (NumOfExecutions) 306, and the rank that the system has assigned to the query after evaluation of the execution data (as described above) (QueryRiskRank) 308. The user can navigate through the table in order to view different aspects of the performance of the high-risk database queries.

FIG. 4 is a screenshot of an exemplary user interface provided by the server computing device 106 for analyzing plan details for high-risk database queries as described herein. As shown in FIG. 4, the user interface includes a table with columns for displaying information about the specific execution plans associated with a high-risk database query, such as such as identifier (SQL_ID) 402, a hash value of the QEP (PlanHashValue) 404, the average execution time (in seconds) (AvgETSecs) 406, and average number of buffer gets (AvgBufferGets) 408, among other data. The user can navigate through the table in order to view different aspects of the performance of each execution plan associated with a high-risk database query.

Figure 5:
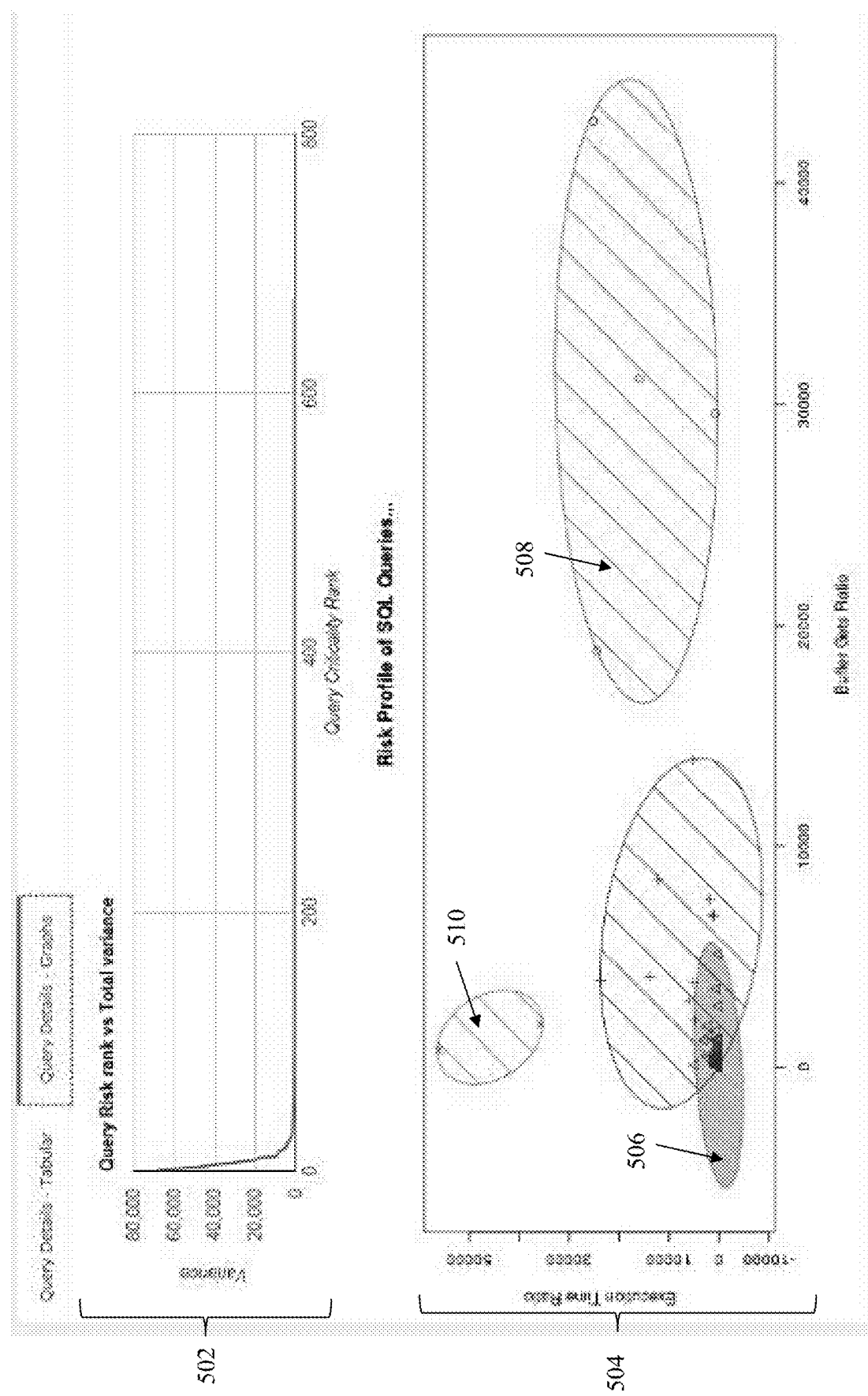
FIG. 5 is a screenshot of an exemplary user interface provided by the server computing device for analyzing a risk profile of database queries in one or more databases.

FIG. 5 is a screenshot of an exemplary user interface provided by the server computing device 106 for analyzing a risk profile of database queries in one or more databases as described herein. As shown in FIG. 5, the user interface includes a first graph 502 that displays a comparison of the query risk rank against the total variance among the QEPs of the query. The user interface also includes a second graph 504 that plots each database query according to its execution time ratio and buffer gets ratio (as explained previously). The second graph displays various regions that are representative of the risk associated with a database query. For example, region 506 includes queries that have a low execution time ratio and a low buffer gets ratio—indicating that these queries have low variances and are thus lower risk. However, region 508 includes queries that have a high buffer gets ratio, and region 510 includes queries that have a high execution time ratio—indicating that these queries have higher variances and may pose a higher risk of performance degradation in the production computing environment. The user can quickly identify specific database queries for further investigation and remediation.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for identifying and mitigating high-risk database queries through ranked variance analysis, the system comprising a server computing device that:
   identifies a plurality of database queries executed against one or more databases in a production computing environment within a predetermined time period, each database query associated with a plurality of execution plans, each execution plan having corresponding plan data elements comprising a query id number, a parsing schema, a number of plan executions, an average execution time, an average number of buffer gets, and a query text;
   for each database query:
      generates execution variance data for the plurality of execution plans for a database query based upon the corresponding plan data elements, comprising:
         determining an execution time variance between the plurality of execution plans for the database query, comprising:
            identifying the average execution time for each of the plurality of execution plans for the database query;
            selecting a maximum average execution time (MaxAET) and a minimum average execution time (MinAET) from the identified average execution times;
            determining a variance between MaxAET and MinAET by:
            (MaxAET−MinAET)/MinAET; and
            assigning the determined variance as the execution time variance; and
         determining a buffer gets variance between the plurality of execution plans for the database query;
   ranks the plurality of database queries according to (i) the execution time variance for each database query, and (ii) the buffer gets variance for each database query;
   identifies one or more high-risk database queries based upon the rank of the plurality of database queries; and
   adjusts one or more execution settings for each of the identified high-risk database queries to mitigate performance degradation in the production computing environment caused by execution of the identified high-risk database queries, comprising changing an execution status for each of the identified high-risk database queries in the database which prevents the identified high-risk database queries from being executed in the production computing environment, and
   when the production computing environment requests execution of any of the identified high-risk database queries, the production computing environment analyzes the execution status for the requested high-risk database queries and determines that the requested high-risk database queries are unavailable for execution.

2. The system of claim 1, wherein determining the buffer gets variance comprises:
   identifying the average number of buffer gets for each of the plurality of execution plans for the database query;
   selecting a maximum average number of buffer gets (MaxABG) and a minimum average execution time (MinABG) from the identified average numbers of buffer gets;
   generating the variance between MaxABG and MinABG by:
   ((MaxABG−MinABG)/MinABG; and
   assigning the determined variance as the buffer gets variance.

3. The system of claim 2, wherein ranking the plurality of database queries comprises sorting the plurality of database queries in a list from a highest value for the execution time variance for each database query to a lowest value for the execution time variance for each database query.

4. The system of claim 2, wherein ranking the plurality of database queries comprises sorting the plurality of database queries in a list from a highest value for the buffer gets variance for each database query to a lowest value for the buffer gets variance for each database query.

5. The system of claim 3, wherein identifying one or more high-risk database queries comprises selecting database queries from the plurality of database queries that are associated with an execution time variance exceeding a predetermined threshold.

6. The system of claim 4, wherein identifying one or more high-risk database queries comprises selecting database queries from the plurality of database queries that are associated with a buffer gets variance exceeding a predetermined threshold.

7. The system of claim 1, wherein adjusting one or more execution settings for each of the identified high-risk database queries to mitigate performance degradation in the production computing environment caused by execution of the identified high-risk database queries comprises, for each of the identified high-risk database queries:
   removing one or more of the execution plans associated with the identified high-risk database query from the database in the production computing environment, the removed one or more execution plans being associated with high query execution times and/or high buffer get values, and
   changing the execution status for the identified high-risk database query in the database to re-enable execution of the identified high-risk database query in the production computing environment.

8. The system of claim 1, wherein adjusting one or more execution settings for each of the identified high-risk database queries to mitigate performance degradation in the production computing environment caused by execution of the identified high-risk database queries comprises, for each of the identified high-risk database queries:
   recompiling one or more of the execution plans associated with the identified high-risk database query to generate new execution plans and storing the new execution plans in the database in the production computing environment, and
   changing the execution status for the identified high-risk database query in the database to re-enable execution of the identified high-risk database query in the production computing environment.

9. The system of claim 1, wherein identifying a plurality of database queries executed against one or more databases in a production computing environment within a predetermined time period comprises:
   filtering one or more database queries from the plurality of database queries based upon a user ID that executed the database query.

10. The system of claim 1, wherein identifying a plurality of database queries executed against one or more databases in a production computing environment within a predetermined time period comprises:
    filtering one or more database queries from the plurality of database queries based upon a number of executions of the database query during the predetermined time period.

11. A computerized method for identifying and mitigating high-risk database queries through ranked variance analysis, the method comprising:
    identifying, by a server computing device, a plurality of database queries executed against one or more databases in a production computing environment within a predetermined time period, each database query associated with a plurality of execution plans, each execution plan having corresponding plan data elements comprising a query id number, a parsing schema, a number of plan executions, an average execution time, an average number of buffer gets, and a query text;
    for each database query:
      generating, by the server computing device, execution variance data for the plurality of execution plans for a database query based upon the corresponding plan data elements, comprising:
        determining an execution time variance between the plurality of execution plans for the database query, comprising:
          identifying the average execution time for each of the plurality of execution plans for the database query;
          selecting a maximum average execution time (MaxAET) and a minimum average execution time (MinAET) from the identified average execution times;
          determining a variance between MaxAET and MinAET by:
          (MaxAET−MinAET)/MinAET; and
          assigning the determined variance as the execution time variance; and
        determining a buffer gets variance between the plurality of execution plans for the database query;
    ranking, by the server computing device, the plurality of database queries according to (i) the execution time variance for each database query, and (ii) the buffer gets variance for each database query;
    identifying, by the server computing device, one or more high-risk database queries based upon the rank of the plurality of database queries; and
    adjusting, by the server computing device, one or more execution settings for each of the identified high-risk database queries to mitigate performance degradation in the production computing environment caused by execution of the identified high-risk database queries, comprising changing an execution status for each of the identified high-risk database queries in the database which prevents the identified high-risk database queries from being executed in the production computing environment, and
    when the production computing environment requests execution of any of the identified high-risk database queries, analyzing, by the production computing environment, the execution status for the requested high-risk database queries and determining that the requested high-risk database queries are unavailable for execution.

12. The method of claim 11, wherein determining the buffer gets variance comprises:
    identifying, by the server computing device, the average number of buffer gets for each of the plurality of execution plans for the database query;
    selecting, by the server computing device, a maximum average number of buffer gets (MaxABG) and a minimum average execution time (MinABG) from the identified average numbers of buffer gets;
    generating, by the server computing device, the variance between MaxABG and MinABG by:
    ((MaxABG−MinABG)/MinABG; and
    assigning, by the server computing device, the determined variance as the buffer gets variance.

13. The method of claim 12, wherein ranking the plurality of database queries comprises sorting, by the server computing device, the plurality of database queries in a list from a highest value for the execution time variance for each database query to a lowest value for the execution time variance for each database query.

14. The method of claim 12, wherein ranking the plurality of database queries comprises sorting, by the server computing device, the plurality of database queries in a list from a highest value for the buffer gets variance for each database query to a lowest value for the buffer gets variance for each database query.

15. The method of claim 13, wherein identifying one or more high-risk database queries comprises selecting, by the server computing device, database queries from the plurality of database queries that are associated with an execution time variance exceeding a predetermined threshold.

16. The method of claim 14, wherein identifying one or more high-risk database queries comprises selecting, by the server computing device, database queries from the plurality of database queries that are associated with a buffer gets variance exceeding a predetermined threshold.

17. The method of claim 11, wherein adjusting one or more execution settings for each of the identified high-risk database queries to mitigate performance degradation in the production computing environment caused by execution of the identified high-risk database queries comprises, for each of the identified high-risk database queries:
   removing, by the server computing device, one or more of the execution plans associated with the identified high-risk database query from the database in the production computing environment, the removed one or more execution plans being associated with high query execution times and/or high buffer get values, and
   changing, by the server computing device, the execution status for the identified high-risk database query in the database to re-enable execution of the identified high-risk database query in the production computing environment.

18. The method of claim 11, wherein adjusting one or more execution settings for each of the identified high-risk database queries to mitigate performance degradation in the production computing environment caused by execution of the identified high-risk database queries comprises, for each of the identified high-risk database queries:
   recompiling, by the server computing device, one or more of the execution plans associated with the identified high-risk database query to generate new execution plans and storing the new execution plans in the database in the production computing environment, and
   changing, by the server computing device, the execution status for the identified high-risk database query in the database to re-enable execution of the identified high-risk database query in the production computing environment.

19. The method of claim 11, wherein identifying a plurality of database queries executed against one or more databases in a production computing environment within a predetermined time period comprises:
   filtering, by the server computing device, one or more database queries from the plurality of database queries based upon a user ID that executed the database query.

20. The method of claim 11, wherein identifying a plurality of database queries executed against one or more databases in a production computing environment within a predetermined time period comprises:
   filtering, by the server computing device, one or more database queries from the plurality of database queries based upon a number of executions of the database query during the predetermined time period.

21. A computer program product, tangibly embodied in a non-transitory computer readable storage device, for identifying and mitigating high-risk database queries through ranked variance analysis, the computer program product including instructions that, when executed by a processor of a server computing device, cause the server computing device to:
   identify a plurality of database queries executed against one or more databases in a production computing environment within a predetermined time period, each database query associated with a plurality of execution plans, each execution plan having corresponding plan data elements comprising a query id number, a parsing schema, a number of plan executions, an average execution time, an average number of buffer gets, and a query text;
   for each database query:
      generate execution variance data for the plurality of execution plans for a database query based upon the corresponding plan data elements, comprising:
         determining an execution time variance between the plurality of execution plans for the database query, comprising:
            identifying the average execution time for each of the plurality of execution plans for the database query;
            selecting a maximum average execution time (MaxAET) and a minimum average execution time (MinAET) from the identified average execution times;
            determining a variance between MaxAET and MinAET by:
            (MaxAET−MinAET)/MinAET; and
            assigning the determined variance as the execution time variance; and
         determining a buffer gets variance between the plurality of execution plans for the database query;
   rank the plurality of database queries according to (i) the execution time variance for each database query, and (ii) the buffer gets variance for each database query;
   identify one or more high-risk database queries based upon the rank of the plurality of database queries; and
   adjust one or more execution settings for each of the identified high-risk database queries to mitigate performance degradation in the production computing environment caused by execution of the identified high-risk database queries, comprising changing an execution status for each of the identified high-risk database queries in the database which prevents the identified high-risk database queries from being executed in the production computing environment, and
   when the production computing environment requests execution of any of the identified high-risk database queries, the production computing environment analyzes the execution status for the requested high-risk database queries and determines that the requested high-risk database queries are unavailable for execution.

* * * * *